United States Patent [19]

Asano

[11] Patent Number: 5,525,131
[45] Date of Patent: Jun. 11, 1996

[54] COATED SEEDS

[76] Inventor: Hiroyoshi Asano, 5-204 Tenjin Heights, 1-3 Hachijogaoka, Nagaokakyo-city, Kyoto, Japan

[21] Appl. No.: 507,794

[22] Filed: Jul. 26, 1995

Related U.S. Application Data

[63] Continuation of Ser. No. 109,571, Aug. 18, 1993, abandoned, which is a continuation of Ser. No. 918,160, Jul. 21, 1992, abandoned, which is a continuation of Ser. No. 577,667, Sep. 4, 1990, abandoned.

[30] Foreign Application Priority Data

Sep. 6, 1989 [JP] Japan .................................. 1-231984

[51] Int. Cl.$^6$ ........................................... A01C 1/06
[52] U.S. Cl. .................. 47/57.6; 47/DIG. 9; 47/DIG. 11
[58] Field of Search ............................. 47/57.6, DIG. 9, 47/DIG. 11, 58

[56] References Cited

U.S. PATENT DOCUMENTS

| | | | |
|---|---|---|---|
| 2,967,376 | 1/1961 | Scott, Jr. | 47/57.6 |
| 3,698,133 | 10/1972 | Schreiber | 47/57.6 |
| 3,905,152 | 9/1975 | Loperfido | 47/57.6 |
| 3,947,996 | 4/1976 | Watts | 47/57.6 |
| 3,950,891 | 4/1976 | Hinkes | 47/57.6 |
| 4,251,952 | 2/1981 | Porter et al. | 47/DIG. 9 |
| 4,753,035 | 6/1988 | Ryan et al. | 47/57.6 |
| 4,802,305 | 2/1989 | Kojimoto et al. | 47/57.6 |

FOREIGN PATENT DOCUMENTS

| | | | |
|---|---|---|---|
| 38-3469 | 4/1938 | Japan . | |
| 51-051106 | 5/1976 | Japan | 47/57.6 |
| 54-85908 | 7/1979 | Japan . | |
| 0130311 | 10/1979 | Japan | 47/57.6 |
| 60-12905 | 1/1985 | Japan . | |
| 1294161 | 10/1972 | United Kingdom . | |

OTHER PUBLICATIONS

Chem–Tech. 1978. "Coat seeds with polymers". American Chemical Society. Reprinted from Chem–Tech vol. 8, pp. 284–287.

*Primary Examiner*—Douglas W. Robinson
*Assistant Examiner*—Elizabeth F. McElwain
*Attorney, Agent, or Firm*—Jordan and Hamburg

[57] ABSTRACT

The present invention relates to coated seeds. The coated seed according to the invention is a seed coated with a coating mass composition comprising 70 to 95 parts by weight of a clay mineral of double-chain structure and 30 to 5 parts by weight of a hydrophobic compound. The coated seed provided by the invention has a coating layer of adequate hardness and yet insures good germination characteristics, thus being contributory to the rationalization and development of agricultural production.

6 Claims, No Drawings

COATED SEEDS

This application is a continuation, of application Ser. No. 08/109,571, filed Aug. 18, 1993, now abandoned, which is a continuation of application Ser. No. 07/918,160, filed Jul. 21, 1992, now abandoned, which is a continuation of application Ser. No. 07/577,667, filed Sep. 4, 1990, now abandoned.

BACKGROUND OF THE INVENTION

The present invention relates to coated seeds.

In the fields of agriculture and forestry there is no exception to the rule that labor savings constitute a major factor in cost reduction. Taking the sowing of vegetable and other seeds as an example, for the purpose of achieving machine sowing as precise as hand sowing and thereby conserving labor requirements, it has been practiced since some years ago to coat seeds with a coating mass such as red earth, clay, perlite, diatomaceous earth, calcium carbonate, talc, calcium hydroxide, aluminum hydroxide, kaolin, etc., with or without the addition of a binder such as polyvinyl alcohol, starch, carboxymethylcellulose, gelatin or the like, by means of a fluidized-bed granulator or a rotary pan (e.g. Japanese Patent Publication No. 38-3469).

When the coated seed thus prepared is sown and, hence, encounters a certain amount of water in the soil, its coating layer absorbs water to undergo cracking in a few positions and is disintegrated into pieces, thus allowing the seed to germinate. However, when the soil is over-moist after a rainfall or due to poor drainage, for instance, the coating layer containing a tacky binder melts under the influence of excessive moisture and encapsulates the seed to prevent the access of oxygen which is essential to the energy metabolism during germination and consequently precludes the normal course of germination.

In order to resolve the above-mentioned problems, there has been proposed a technique which comprises incorporating a water-repellent or water-proofing compound such as oil, fat, cellulose ester, vinyl resin, urethane resin, aluminum acetate, aluminum formate, a zirconium compound, or a higher fatty acid, inclusive of a metal salt thereof, in the coating mass composition to be used for the formation of a coating layer (e.g. Japanese. Patent Publication No. 38-3469, Japanese Kokai Patent Publication No. 54-85908, Japanese Kokai Patent Publication No. 60-129051and British Patent No. 1294161).

However, the simple coating of seeds with a coating mass composition comprising the conventional coating material in combination with such a water-repellent or water-proofing compound (hereinafter referred to collectively as a hydrophobic compound) does not insure a balanced assortment of characteristics necessary for coated seeds, such as adequate hardness, optimal mode of cracking upon absorption of water (disintegration pattern), shape retentivity after cracking into blocks upon absorption of water (the condition in which the coating layer does not stick around to the seed as a muddy mass that precludes contact of the seed with water and atmosphere). Moreover, this method hardly provides for germination characteristics comparable to those of the uncoated seeds. The use of an organic binder for imparting an appropriate degree of hardness to the coating layer is undesirable from the standpoint of production efficiency or shape retention after cracking.

SUMMARY OF THE INVENTION

The object of the present invention is to provide a coated seed comprising a coating layer free of an organic binder and, yet, having adequate hardness, yielding blocks with high shape retentivity on fragmentation, and not interferring with the germination of the seed.

The coated seed according to the present invention is a seed coated with a coating mass composition containing 70 to 95 parts by weight of a clay mineral of double-chain structure and 30 to 5 parts by weight of a hydrophobic compound.

Thus, the coated seed of the present invention can be produced by treating a seed with a coating mass composition comprising a clay mineral of double-chain structure and a hydrophobic compound and water in otherwise the conventional manner.

The, clay mineral of double-chain structure which is incorporated in the coating mass composition of the invention should be microporous (able to "breathe"), be able to absorb water, and coagulates in contact with an adequate amount of water. Therefore, this clay mineral coagulates to a suitable degree of hardness in the presence of a hydrophobic compound without requiring any special binder.

Because of the above-mentioned characteristics of the clay mineral of double-chain structure, the coated seed of the invention has the following characteristics.

(1) Because the coating layer has adequate hardness when dry (when stored at ambient temperature), it is not fragmented during shipment and machine sowing.

(2) Only in contact with a small to large amount of water, e.g. in the soil, the coated seed (the coating layer) cracks due to a strain caused by swelling.

(3) Because no organic binder is used, the coating layer is not slurried in contact with water but is neatly cracked.

(4) Since the blocks produced on cracking retain the original shape of the coating layer, the coating layer does not stick around the seed as a muddy mass to encapsulate the seed. Therefore, the seed retains access to water and air.

(5) The coated seed is not inferior to the uncoated seed in germination characteristic.

(6) Since blocks of the coating layer still retain an adequate degree of water holding power, there are cases in which the germination vigor and germination ratio of the coated seed are rather higher than those of the uncoated seed.

DETAILED DESCRIPTION OF THE PREFERRED EMBODIMENTS

The important matters relevant to the reduction of the invention to practice are respectively described below.

(1) The clay mineral of double-chain structure

Clay minerals of double-chain structure are structurally quite different from clay minerals having a layer structure as the basic unit. (Kaolinite and montmorillonite are examples of clay minerals of the latter structure. While these materials are generally called clay minerals, the same nomenclature is used in this specification as well.) With any clay mineral of layer structure, the outstanding effects of the invention cannot be implemented.

As typical clay minerals of double-chain structure, attapulgite, sepiolite and palygorskite may be mentioned. Among them, attapulgite is particularly desirable.

Clay minerals of double-chain structure are commercially available, as baked or otherwise pretreated, in various types such as gel type, oil/water-absorbent type, etc. and in various grades in regard to water proofing characteristic. Morphologically, these clay minerals are available in the entire spectrum of granule to microfine powder. For the purposes of the present invention, finely divided water-proof clay minerals are preferred.

The ratio of said clay mineral of double-chain structure to the powder of the hydrophobic compound to be described hereinafter is 95~70 parts by weight to 5~30 parts by weight and preferably 90~80 parts by weight to 10~20 parts by weight. When the proportion of the clay mineral of double-chain structure is less than 70 parts by weight, the hardness of the coated seeds is insufficient and, because of an increased relative amount of the hydrophobic compound, coating processability is sacrificed. On the other hand, when the proportion of the hydrophobic compound is less than 5 parts by weight, the expected effect of addition of the hydrophobic compound is not obtained and the coating layer is not easily cracked in contact with water.

Moreover, the powdery mixture of said clay mineral of double-chain structure and hydrophobic compound is preferably comminuted to 200 mesh or less (100% pass through a 200-mesh sieve) before use. If it is larger, the powder may not readily adhere to the seed.

(2) Hydrophobic compound

A variety of hydrophobic compounds are known but for the purposes of the present invention, a finely divided naturally-occurring material, either as it is or as partially pre-treated, is preferably employed. As such materials, there may be mentioned microfine powders of fatty acids of 6 carbons or more or metal salts thereof, aliphatic alcohols of 6 carbons or more or adducts thereof to alkylene oxides, oils, fats and waxes. Particularly preferred are calcium salts of fatty acids of 6 carbons or more, barium salts of fatty acids of 6 carbons or more, and higher aliphatic alcohol-propylene oxide adducts of 6 carbons or more. Organic polymers and other substances which cannot be comminuted are undesirable. The preferred particle size is 100% pass through a 200-mesh sieve.

(3) Binder

In the coating of seeds, it is common practice to use a hydrophilic polymer which may be synthetic, semi-synthetic, naturally-occurring, or biochemically synthesized, such as polyvinyl alcohol, carboxymethytcellulose, gum arabic, pullulan and so on, as a binder. Such a binder is used as dissolved in water which is commonly used as the wetting agent in coating.

In the present invention, however, no such binders are required but only plain water can be used as the wetting agent to provide coated seeds having adequate hardness. The quantity of water to be used in the present invention is preferably in the range of 50 to 150 weight % based on the weight of the powdery composition (coating mass composition). When the amount of water is less than 50 weight %, coating is difficult, while the use of more than 150 weight % of water results in caking.

(4) Other components

In the coating mass composition for use in the production of the coated seed of the present invention, various auxiliary agents such as plant hormones, plant nutrients, plant growth regulators, fungicides, oxygen generators, fertilizers, etc. can be incorporated as desired.

The above-mentioned components may also be applied to the raw seed directly and/or the coated seed surface by deposition or film coating. Moreover, for the purpose of permitting the identification of the coating seed product by color, the above components may be blended with a color coating material before application.

Since the present invention provides a coated seed having a coating layer of adequate hardness and a good germination characteristic as mentioned above, it can contribute greatly to the rationalization and development of agricultural production.

The following examples and comparative examples are intended to illustrate of the invention in further detail but should by no means be construed as defining the metes and bounds of the invention.

EXAMPLES 1 & 2 AND COMPARATIVE EXAMPLES 1–8

A tilting rotary pan was charged with 1 l of carrot seeds with a germination ratio of about 90%. The seeds are then sprayed with the wetting agent mentioned in Table 1, and thereafter the coating mass composition, also shown in Table 1, was added for coating, which two steps were repeated until the product size had grown to 3.5 mm. The resulting products were finally dried at 40° C. for 2 hours in an air current.

With the coated seeds thus obtained, hardness and germination tests were carried out. The results are also set forth in Table 1.

The germination test was performed in the following manner. Two sheets of filter paper were put in a petri dish with a diameter of 9 cm and 5 ml of water was poured into the petri dish. Then, 100 coated seeds were laid on the filter paper and incubated in an incubator at 25° C. A control test was carried out with the uncoated seeds.

The terms 'germination vigor' and 'germination ratio' in Table 1 have the following meanings.

The germination ratio is the percentage of the number of seeds which have germinated by the final day of the observation period which is predetermined according to the kind of seed relative to the total number of seeds in the petri dish. The germination vigor is the percentage of the number of seeds which have germinated with vigor within a shorter period (which is also predetermined according to the kind of seed) relative to the total number of seeds in the petri dish.

TABLE 1

| | Coating mass composition (wt. parts) | | Wetting agent (wt. % conc.) | Hardness of coated seed* (g) | Mode of cracking | Germination characteristics | |
|---|---|---|---|---|---|---|---|
| | | | | | | Germination vigor (day 4) (%) | Germination ratio (day 10) (%) |
| Example 1 | Attapulgite Stearyl alcohol- | 80 20 | Water | 680 | The coating layer was neatly cracked into halves but retained | 90 | 92 |

TABLE 1-continued

|  | Coating mass composition (wt. parts) |  | Wetting agent (wt. % conc.) |  | Hardness of coated seed* (g) | Mode of cracking | Germination characteristics Germination vigor (day 4) (%) | Germination ratio (day 10) (%) |
|---|---|---|---|---|---|---|---|---|
|  | propylene oxide (2 mol) adduct |  |  |  |  | its original shape, with the seed being ejected out or |  |  |
| Example 2 | Attapulgite Calcium stearate | 85 15 | Water |  | 630 | remaining in position within the cracked coating layer. | 91 | 93 |
| Comparative Example 1 | Talc Calcium stearate | 85 15 | Polyvinyl alcohol (aq. sol.) 0.5 |  | 780 | The coating layer was split into halves but adherent to the seed as molten masses. | 68 | 84 |
| Comparative Example 2 | Silica Stearyl alcohol | 90 10 | Carboxymethyl- cellulose (aq. sol.) 4 |  | 650 |  | 72 | 86 |
| Comparative Example 3 | Clay Calcium stearate | 85 15 | Carboxymethyl- cellulose (aq. sol.) 4 |  | 730 |  | 70 | 84 |
| Comparative Example 4 | Clay Calcium stearate | 85 15 | Water |  | Not solidified | — | — | — |
| Comparative Example 5 | Clay | 100 | Polyvinyl alcohol (aq. sol.) 0.3 |  | 910 | The coating layer was not cracked but adherent to the seed as muddy masses. | 15 | 20 |
| Comparative Exmaple 6 | Attapulgite Calcium stearate | 65 35 | Water |  | 320 | Similar to Example 1 and 2. | 86 | 91 |
| Comparative Example 7 | Attapulgite Calcium stearate | 97 3 | Water |  | 850 | Hardly cracked | 75 | 85 |
| Comparative Example 8 | Raw seed (not coated) |  | — |  | — | — | 84 | 92 |

*Compressive strength at break was determined with a Shimadzu Autograph (the mean value of 20 coated seeds)

As is apparent from Table 1, the coating layer of the coated seed of the invention was cracked into blocks in contact with-water and did not stick around the seed so that the access of the seed to oxygen etc. was not hindered, with the germination ratio being equal to that of the uncoated seed. Furthermore, the coating layer, in blocks, still retained a water holding power and acted as a source of water to the seed so that the germination vigor was rather greater than that of the uncoated seed (Comparative Example 8).

The coated seeds of Comparative Examples 1~3 and 7 were obviously inferior to the uncoated seed in germination vigor and germination ratio. In Comparative Example 4, the coating mass composition did not solidify satisfactorily so that the seed could not be coated. The coated seed of Comparative Example 5 was much retarded in germination. The coated seed of Comparative Example 6 was poor in coating yield and, in addition, was lower in hardness by about 40 to 50 percent than the products of Examples.

EXAMPLES 3 & 4 AND COMPARATIVE EXAMPLE 9

Lettuce seeds with a germination ratio of not less than 95% were coated with the coating mass compositions shown in Table 2 in the same manner as Examples 1 and 2.

With the coated seeds thus obtained, hardness and germination tests were carried out. The results are set forth in Table 2. A control test was performed with the uncoated seed.

EXAMPLES 5 & 6 AND COMPARATIVE EXAMPLE 10

Chinese cabbage seeds with a germination ratio of not less than 95% were coated with the coating mass compositions shown in Table 3 in the same manner as Examples 1 and 2.

With the coated seeds thus obtained, hardness and germination tests were carried out. The results are set forth in Table 3, A control test was performed with the uncoated seed.

TABLE 2

|  | Coating mass composition (wt. parts) |  | Wetting agent (wt. % conc.) |  | Hardness of coated seed* (g) | Mode of cracking | Germination characteristics Germination vigor (day 4) (%) | Germination ratio (day 6) (%) |
|---|---|---|---|---|---|---|---|---|
| Example 3 | Attapulgite Stearyl alcohol- propylene oxide (2 mol) adduct | 80 20 | Water |  | 510 | The coating layer was neatly cracked into halved but retained its original shape, with the seed being ejected out or | 97 | 97 |
| Example | Attapulgite | 85 | Water |  | 560 | remaining in position within the | 98 | 99 |

TABLE 2-continued

| | Coating mass composition (wt. parts) | Wetting agent (wt. % conc.) | Hardness of coated seed* (g) | Mode of cracking | Germination characteristics | |
|---|---|---|---|---|---|---|
| | | | | | Germination vigor (day 4) (%) | Germination ratio (day 6) (%) |
| 4 | Calcium stearate | 15 | | cracked coating layer. | | |
| Comparative Example 9 | Raw seed (not coated) | — | — | — | 98 | 98 |

*Same as Table 1

TABLE 3

| | Coating mass composition (wt. parts) | Wetting agent (wt. % conc.) | Hardness of coated seed* (g) | Mode of cracking | Germination characteristics | |
|---|---|---|---|---|---|---|
| | | | | | Germination vigor (day 2) (%) | Germination ratio (day 3) (%) |
| Example 5 | Attapulgite Stearyl alcohol-propylene oxide (2 mol) adduct | 80 Water 20 | 420 | The coating layer was neatly cracked into halved but retained its original shape, with the seed being ejected out or remaining in position within the cracked coating layer. | 95 | 97 |
| Example 6 | Attapulgite Calcium stearate | 85 Water 15 | 450 | | 99 | 99 |
| Comparative Example 10 | Raw seed (not coated) | — | — | — | 93 | 97 |

*Same as Table 1

What is claimed is:

1. A seed coated with a coating mass composition comprising 70 to 95 parts by weight of a clay mineral of double-chain structure and 30 to 5 parts by weight of a hydrophobic compound.

2. A coated seed according to claim 1 in which said clay mineral of double-chain structure is at least one member selected from the group consisting of attapulgite, sepiolite and palygorskite.

3. A coated seed according to claim 1 in which said clay mineral of double-chain structure is attapulgite.

4. A coated seed according to claim 1 in which said hydrophobic compound is at least one member selected from the group consisting of fatty acids of 6 carbons or more, metal salts thereof, aliphatic alcohols of 6 carbons or more, aliphatic alcohol-alkylene oxide adducts of 6 carbons or more, oils, fats and waxes.

5. A coated seed according to claim 1 in which said hydrophobic compound is at least one member selected from the group consisting of calcium salts of fatty acids of 6 carbons or more, barium salts of fatty acids of 6 carbons or more, and aliphatic alcohol-propylene oxide adducts of 6 carbons or more.

6. A coated seed according to claim 1 in which the coating mass composition consists essentially of 70 to 95 parts by weight of a clay mineral of double-chain structure and 30 to 5 parts by weight of a hydrophobic compound.

* * * * *